United States Patent Office 2,795,572
Patented June 11, 1957

2,795,572

EPOXY ESTERS OF CARBONIC ACIDS AND THEIR POLYMERS

Albert C. Mueller, Berkeley, and Edward C. Shokal, Walnut Creek, Calif., assignors to Shell Development Company, New York, N. Y., a corporation of Delaware No Drawing. Application May 24, 1954,
Serial No. 432,012

18 Claims. (Cl. 260—77.5)

This invention relates to a new class of epoxy-substituted organic compounds and to their preparation. More particularly, the invention relates to new epoxy esters of carbonic acids, to their preparation and to the utilization of the esters, particularly as stabilizers and plasticizers and as monomers for the preparation of improved polymeric products.

Specifically, the invention provides new and particularly useful epoxy compounds comprising esters of epoxy-substituted alcohols, i. e., alcohols possessing at least one

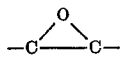

group, and acid components of the group consisting of carbonic acid, carbonic acid monohalides and acid esters of carbonic acid, said

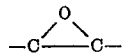

remaining intact in the ester molecule. The invention further provides polymeric products obtained by polymerizing the above-described epoxy esters by themselves or with other epoxy-substituted compounds.

It is an object of the invention to provide a new class of epoxy-substituted organic compounds. It is a further object to provide certain novel epoxy esters of carbonic acids, and to a method for their preparation. It is a further object to provide new epoxy esters which are particularly useful and valuable in the chemical and related industries. It is a further object to provide epoxy esters which are valuable as stabilizers and plasticizers for vinyl halide polymers. It is a further object to provide epoxy esters of carbonic acids which are valuable as lubricants and crease- and shrink-proofing agents for textile fabrics. It is a further object to provide novel epoxy esters of carbonic acids that may be polymerized to form polymers having valuable properties. Other objects and advantages of the invention will be apparent from the following detailed description thereof.

It has now been discovered that these and other objects may be accomplished in part by the novel compounds of the invention comprising esters of alcohols possessing at least one

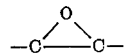

group, and acid components of the group consisting of carbonic acid, carbonic acid monohalides and acid esters of carbonic acid, said

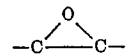

grouping in the alcohol being retained as such in the ester molecule. It has been found that these particular esters possess unobvious beneficial properties which make them particularly adapted for many important commercial applications. These novel esters are, for example, good stabilizers for halogen-containing polymers, such as polymers of vinyl chloride, and endow the resulting compositions with improved resistance to discoloration. The novel esters are also valuable in the role of plasticizers and softening agents for vinyl polymers and synthetic rubbers. When added to the halogen-containing polymers, the novel esters may act both as a plasticizing agent and as a stabilizing agent. The novel esters possessing a plurality of epoxy groups also act as lubricants and softening agents for textiles and when cured within the fibers of the fabrics tend to impart crease- and shrink-resistance to the fabrics.

It has also been found that when the above-described novel esters are treated with certain catalytic materials, such as acids, anhydrides and primary and secondary amines, they polymerize through the epoxy linkage to form polymeric products which have valuable properties. They may be polymerized in this manner by themselves or with other epoxy materials. As indicated hereinafter, particularly valuable products are obtained by polymerizing the novel esters with polyepoxide polyethers obtained by reacting polyhydric phenols with epichlorohydrin.

The epoxy-substituted alcohols, the carbonic acid esters of which are provided by the present invention, comprise those alcohols possessing at least one

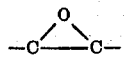

group i. e. a vicepoxy group. The alcohols may be monohydric or polyhydric, primary, secondary or tertiary and may be saturated, unsaturated, branched or unbranched and open-chain or cyclic. Examples of these alcohols include, among others, the following alcohols having as high as 18 carbon atoms per molecule: 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-5-propenol, 2,3 - dimethyl-4,5-epoxyoctanol, 2-chloro-4,5-epoxyoctanol, 3,4-epoxy-5-chlorocyclohexanol, 2,3-epoxypropoxypropanol, 2,3-epoxypropoxyhexanol, 2,3-epoxypropoxy - 2,3 - dihydroxyheptane, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 15 carbon atoms, such as 2,3-epoxypropanol, 3,4-epoxybutanol, 3,4-epoxydodecanol, 2-methyl-2,3-epoxypropanol, 2,3-cyclohexanol, 2,3-epoxypropoxyethanol, 2,3-epoxypropoxyoctanol, and the like.

Particularly preferred epoxy-substituted alcohols are the epoxy-alkanols, epoxyalkoxyalkanol, epoxyalkenols, epoxyalkoxyalkenols, epoxycycloalkanols and epoxyalkoxycycloalkanols, epoxycycloalkenols and epoxyalkoxycycloalkenols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy-5-octenol, 3,4 - epoxycyclohexanol, 2,3-epoxypropoxy-4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their esters as well as the superior properties possessed by such esters.

The carbonic acids, the epoxy esters of which are provided by the present invention, comprise the members of the group consisting of carbonic acid, i. e.,

carbonic acid monohalides, i. e., acids of the formula

XCOH wherein X is a halogen atom, preferably chlorine, and acid esters of carbonic acid.

The acid esters of carbonic acid used in the preparation of the epoxy esters are those derived by the partial esterification of carbonic acid with monohydric or polyhydric compounds. If monohydric compounds are employed, only one of the acid groups will be esterified to form acid esters of the formula

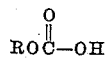
ROC—OH wherein R is derived from the monohydric compound by removing the OH group. Monohydric compounds used for this purpose may be aliphatic, cycloaliphatic, aromatic or heterocyclic and may be saturated or unsaturated. Examples of such compounds include, among others, the following alcohols having at least 3 carbon atoms per molecule and the following phenols having at least 6 carbon atoms per molecule allyl alcohol, butyl alcohol, octyl alcohol, decyl alcohol, cyclohexanol, cyclopentanol, benzyl alcohol, phenol, 3 thiaoctanol, phenol 4-thiadodecanol, chloroallyl alcohol, cyclohexenol, tetrahydropyran-3-methanol, tetrahydrofuran-3 ethanol, furfuryl alcohol, and the like. Particularly preferred monohydric compounds are the alkanols, alkenols and phenols containing no more than 12 carbon atoms. Coming under special consideration, particularly because of the ability of the resulting esters to produce improved resinous products are the ethylenically unsaturated monohydric alcohol, such as allyl alcohol, methallyl alcohol, and the like.

If the acid esters are derived from compounds containing a plurality of OH groups, they are preferably those of the formulae

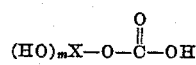

and

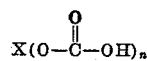

wherein X is derived from the polyhydric compound by removing the OH groups, $n$ is an integer of at least 2 and $m$ is an integer of at least 1. The polyhydric compound used in the preparation of these acid esters may have two, three or more hydroxyl groups and may be aliphatic, aromatic or heterocyclic, such as, for example, the following having at least 2 carbon atoms: ethylene glycol, diethylene glycol, glycerol, pentaerythritol, mannitol, sorbitol, cellulose, methyltrimethylolmethane, 1,4,6-octanetriol, butanediol, 1,5-pentanediol, glycerol allyl ether, sucrose, fructose, maltose, 3,3'-thiodipropanol, 4,4'-sulfonyldipropanol, 1,3,6-hexanetriol, 3,6-dithiaoctanediol - 1,8, cyclohexanediol - 1,4, tetrahydrofuran - 2,5 - dipentanol, tetrahydropyrrole - 2,3 dipropanol, 2,5 - dihydroxy - 3,4 - dihydro - 1,2 - pyran, and the like.

Other examples of polyhydric compounds include those obtained by reacting polyhydric phenols with epichlorohydrin to form products of the type

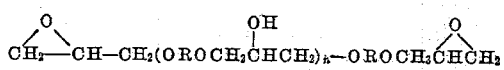

wherein R is a bivalent radical derived from the polyhydric phenol and $n$ is an integer greater than one. Suitable polyols may also be derived from polyepoxides by opening the epoxide group by hydrolysis, reaction with amines, and the like, reactions.

The polyhydric compounds employed are preferably the aliphatic and cycloaliphatic polyhydric alcohols possessing from 2 to 3 hydroxyl groups and not more than 12 carbon atoms, and mono-and polynuclear aromatic phenols possessing from 2 to 3 hydroxyl groups and not more than 18 carbon atoms, such as the following polyhydric alcohols, mononuclear phenols, and dinuclear dihydric phenols containing at least 13 carbon atoms: bisphenol, resorcinol, glycerol, pentaerythritol, mannitol, ethylene glycol, diethylene glycol, 1,5-pentanediol, 1,6-hexanediol, 1,3,5-pentanetriol, polyallyl alcohol, and the like. Coming under special consideration are the alkanediols and cycloalkanediols containing no more than 12 carbon atoms and di(hydroxyaryl)alkanes containing no more than 18 carbon atoms.

Examples of the above described acid esters include, among others, allyl hydrogen carbonate, cresyl hydrogen carbonate, cyclohexyl hydrogen carbonate, methallyl hydrogen carbonate, dodecyl hydrogen carbonate, 1,5-pentanediol bis(hydrogen carbonate), ethylene glycol bis(hydrogen carbonate), glycerol tri(hydrogen carbonate), 4,4'-sulfonyldipropanol bis(hydrogen carbonate), and tetrahydropyran-2,3-dipropanol bis(hydrogen carbonate).

The novel epoxy esters of the present invention are those derived by esterifying any one of the above-described carbonic acid components with any one or more of the above-described epoxy alcohols. Examples of the claimed epoxy esters include, among others, di(2,3-epoxypropyl) carbonate, allyl 2,3-epoxypropyl carbonate, ethylene glycol bis(2,3-epoxypropyl carbonate), 1,5-pentanediol bis(3,4-epoxybutyl carbonate), di(epoxypropoxyethyl) carbonate, allyl epoxypropoxyethyl carbonate, phenol 2,3 - epoxypropyl carbonate, octyl 4,5 - epoxycyclohexyl carbonate, 1,5 - pentanediol allyl epoxypropyl carbonate, di(4,5 - epoxyoctyl) carbonate, bis-phenol bis-(2,3-epoxypropyl carbonate)

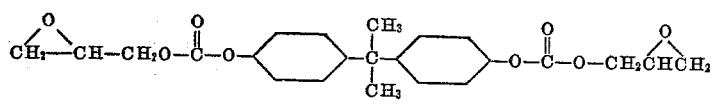

di(3,4-epoxydecyl) carbonate, glycerol tri(2,3-epoxypropyl carbonate), 1,6 - hexanediol bis(2,3 - epoxyhexyl carbonate), 1,5 - pentanediol bis(2,3 - epoxyoctyl carbonate), tetrahydropyran - 2,4 - dipropanol bis(2,3-epoxyheptyl carbonate), 4,4' - thiodipropanol, bis(2,3 - epoxydecyl carbonate).

The preferred epoxy esters of the invention are those derived from (1) carbonic acid, carbonic acid monohalide and acid esters of carbonic acid and monohydric and polyhydric alcohols which alcohols contain no more than 12 carbon atoms, and (2) epoxy-substituted aliphatic and cycloaliphatic monohydric alcohols containing from 3 to 12 carbon atoms, such as for example, di(2,3-epoxypropyl) carbonate, allyl 2,3 - epoxypropyl carbonate, 1,5-pentanediol bis(2,3 - epoxypropyl carbonate), 1,6 - hexanediol allyl carbonate, 2,3 - epoxypropyl carbonate, di-(3,4 - epoxycyclohexyl) carbonate, allyl 4,5 - epoxycyclohexyl carbonate, and 4,4' - sulfonyldipropanol bis(4,5-epoxyhexyl carbonate).

The novel esters of the invention may be prepared by a variety of different methods. Many of them may be prepared, for example, by epoxidizing the corresponding unsaturated ester of a carbonic acid, carbonic acid monohalide or carbonic acid ester, or they may be prepared by reacting the epoxy-substituted alcohol with a carbonic acid halide corresponding to the desired acid or acid ester.

The epoxidation of the unsaturated esters of the carbonic acid, carbonic acid halide or acid ester is advantageously carried out by reacting the unsaturated ester with an epoxidizing agent at a temperature between about —20° C. to about 60° C. Organic peracids, such as peracetic, perbenzoic, monoperphthalic and the like, acids, are usually effective epoxidizing agents for this type of reaction. It is preferred to carry out the reaction in a suitable mutual solvent for the reactants product. Chloroform is an especially useful solvent for this purpose, but other materials such as ethyl ether, dichloromethane, benzene, ethyl acetate, etc., are also suitable. It is not necessary to operate under anhydrous conditions but the amount of water present should be limited so as to avoid excessive hydrolysis of the epoxy groups. Up to 25% water in the reaction mixture can be tolerated. The epoxy-substituted esters may be recovered from the reaction mixture by any suitable means, such as distillation, extraction and the like.

The unsaturated esters of carbonic acid, carbonic acid halides or acid esters used in the above-described epoxidation reaction are preferably the esters of the above-described acid components and ethylenically unsaturated alcohols, such as, for example, allyl alcohol, methallyl alcohol, crotyl alcohol, 4-hexenol, 5-decenol, 2,4-hexadienol, 3-pentenol, 4,6-octadecenol, 2-butyl-2-propenol, 2-phenol-2-propenol, and 2-methyl-3-butenol. Examples of such unsaturated esters include, among others, diallyl carbonate, dimethallyl carbonate, pentanediol-1,5 bis-(allyl carbonate), diethylene glycol bis(allyl carbonate), bis-phenol phenyl methallyl carbonate and phenyl allyl carbonate.

The novel esters of the invention may also be prepared by treating the desired epoxy-substituted alcohol with phosgene or a carbonic acid halide in the presence of a hydrogen halide absorbing material. This method of preparation may be illustrated by the following equation showing the preparation of allyl 2,3-epoxypropyl carbonate by reacting allyl chloro-carbonate with glycidol:

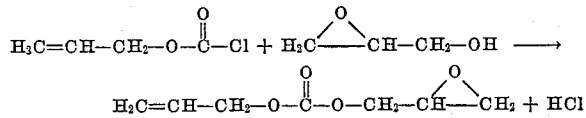

This type of reaction may be carried out by simple mixing of the desired halide with the alcohol in an inert solvent, such as toluene or benzene, in the presence of a hydrogen halide absorbing material at relatively low temperatures. The reactants may be employed conveniently in substantially stoichiometrically required amounts, although in the event one reactant is more precious than the other a moderate excess of the less precious may be employed to insure high conversion of the other reactant to desired product. The reaction is preferably carried out at temperatures within the range of —10° C. to 30° C., and more preferably, between the range of 0° C. to 15° C. In the event excessive heat is liberated in the reaction mixture, the reaction mixture may be cooled or the reaction may be maintained under control by dilution of the mixture with an inert solvent. The reaction may also be regulated by the controlled addition of one reactant, e. g., the halide may be added dropwise to the other reactant. The material used to absorb the hydrogen halide should be one that would not react with the acid halide or epoxy group or cause polymerization of the epoxide. Preferred materials are the inorganic bases and the tertiary amines, such as triethylamine, triamylamine, pyridine, and the like. Upon completion of the reaction, any salt formed by the reaction of the added hydrogen halide absorbing material and the liberated hydrogen halide may be removed from the reaction mixture by filtration or equivalent means and the filtrate suitably treated to recover the desired ester. In most cases, fractional distillation is the most convenient method for recovering the desired product although it will be appreciated that other applicable methods may be used in the appropriate cases.

The epoxy esters of the present invention are mobile to viscous liquids having medium to high boiling points, e. g. 35° C. to 200° C. at 1 mm. Some of the higher molecular weight esters may be resinous solids. They all possess at least one epoxy group which readily reacts with amines, mercaptans, phenols and acids to produce a variety of new and valuable derivatives. The epoxy esters of the carbonic acid monohalides, such as the epoxy esters of monochlorocarbonate, are particularly valuable as chemical intermediates as they may react either through the epoxy group or hte acid halide group. They may react through the halide group, for example, with alcohols to form esters, with amines to form carbamates or with alkyl hydroperoxides to form peresters.

The epoxy esters of the present invention are soluble in a great many oils and solvents and are compatible with various synthetic polymers and resins. The epoxy esters are particularly valuable as additives for vinyl polymers as they act to plasticize the polymer and form compositions having good flexibility and strength over a wide range of temperature.

The vinyl polymers that may be plasticized with the novel esters of the invention include the homopolymers, copolymers and interpolymers of monomers having a $CH_2=C=$ group, such as styrene, vinyl phenol, acrylic acid esters as methyl acrylate, propyl acrylate, esters of substituted acrylic acids, such as methyl methacrylate, lauryl methacrylate, vinylidene chloride, vinyl chloride, acrylonitrile, methacrylonitrile, vinyl esters of vinyl acetate, vinyl benzoate, vinyl caproate, diallyl phthalate, diallyl succinate, vinyl ethyl ether, vinyl ketones, vinyl pyridine, and the like.

Particularly preferred materials to be plasticized with the novel esters are the halogen-containing polymers, and particularly the homopolymer of the vinyl halides and copolymers of the vinyl halides and dissimilar vinyl monomers, such as the ethylenically unsaturated esters.

A single ester may be used as the plasticizer or a mixture of two or more of the compounds may be utilized. In addition, the esters may be used as plasticizers in combination with other plasticizing materials, such as dioctyl phthalate, dibutyl phthalate, tricresyl phosphate, dibutyl sebacate, and the like.

The amount of the esters to be incorporated with the above-described polymers may vary over a considerable range depending upon the particular type of polymer, intended use of the product, etc. In most cases, the amount of the plasticizer will vary from about 20 to 150 parts by weight per 100 parts by weight of resins. A more preferred range of plasticizer comprises 40 parts to 75 parts by weight for every 100 parts by weight of resins.

The polymer and ester may be compounded by means of conventional equipment such as mills of the heated roll type or internal mixers. The plasticizer and other compounding ingredients, such as fillers and stabilizers, are worked into the polymer so that they are thoroughly dispersed therein by means of such equipment, and the resultant composition then molded, calendered, extruded or otherwise formed into articles of the desired shape.

The novel esters of the invention may also be used as stabilizer for halogen-containing polymers. The esters are easily compatible with these polymers and in combination therewith form compositions having resistance to discoloration by heat and/or light. The novel esters may be used as stabilizing agents by themselves or in combination with other stabilizers, such as urea and thiourea derivatives, metal salts, etc.

In most cases, the esters are effective as stabilizers in amounts varying from about .1% to about 5% by weight of the polymer being stabilized, but larger or smaller amounts may be employed as desired or necessary. If other stabilizers are employed in combination with the novel esters, the esters may generally be utilized in smaller quantities, such as from about .01% to about 2% by weight of the polymer.

The esters may be incorporated into the halogen-containing polymers by any suitable method. They may be added in a dissolved, suspended or pulverulent state to the desired polymer which in turn may be in a dissolved, dispersed or solid state. In some cases, it may be possible to introduce the novel esters in the reaction mixture during the formation of the halogen-containing polymer. In most cases, however, it will probably be more desirable to add the ester by merely mixing the polymer and ester in a masticator or on heated differential rolls.

As noted above, the novel esters also act as plasticizing materials for these halogen-containing polymers so with these polymers it is possible to utilize the esters as combined stabilizer-plasticizers. In this case, the esters will be added in amounts and in the manner described hereinabove for use of the esters as plasticizers and in that case, the resulting composition will display the desired improvement in flexibility as well as increased resistance to heat and light.

The epoxy esters, and particularly the esters containing a plurality of epoxy groups, are also valuable in the formation of improved resinous products as they may be polymerized alone or in combination with other epoxide containing materials to produce valuable polymers. Epoxides that may be copolymerized with these epoxy esters include, among others, glycidyl polyethers of polyhydric phenols obtained by reacting polyhydric phenols, such as di(4-hydroxyphenyl)propane, resorcinol, and the like, with an excess of chlorohydrin, such as epichlorohydrin, polyepoxide polyesters obtained by reacting an alkane polyol, such as glycerol and sorbitol, with epichlorohydrin and dehydrochlorinating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are also referred to as "ethoxylene" resins. See Chemical Week vol. 69, page 27, for September 8, 1951.

Curing of the epoxy esters of the present invention alone or in combination with the above-noted dissimilar epoxides is preferably accomplished by heating the product or products in the presence of a catalyst, such as an amine catalyst as ethylene diamine, amine-aldehyde or amide-aldehyde type resins, such as those prepared from formaldehyde and amides or amines as urea, thiourea, hydrovy urea, phenyl thiourea, and the like, dialdehydes, polycarboxylic acid, polymercaptans, and the like. The amount of catalyst utilized will vary depending upon the type of catalyst and reactants selected, but in most cases will vary from about .1% to 5% by weight. The temperatures employed in the polymerization may also vary over a wide range. In most instances, the polymerization may be accomplished at a temperature varying from about 20° C. to about 100° C., and more preferably from 30° C. to 70° C.

The polymers and copolymers prepared from the polyepoxide of the present invention as described above are useful for the formation of pottings, castings, coatings and rigid plastic articles.

The epoxy esters of the present invention possessing ethylenic groups may also be polymerized through such groups to form polymeric esters having a plurality of epoxy groups. This may be accomplished by heating the ester with a peroxide catalyst at a temperature between 50° C. and 150° C. They may also be copolymerized with other unsaturated monomers containing at least one CH$_2$=C< group such as acrylonitrile, styrene, vinyl chloride, methyl acrylate, vinylidene chloride and the like. Such polymers are very useful as plasticizers and stabilizers.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation and some of the properties of allyl epoxypropyl carbonate.

About 74 parts of glycidol was dissolved in 400 parts of toluene and 101 parts of triethylamine and the mixture placed in a reaction kettle equipped with stirrer, thermometer well, condenser and dropping funnel. The temperature of the mixture was reduced to 5° C. in an ice-salt bath. 120 parts of allyl chloroformate was then slowly added through the dropping funnel. The mixture was held at 12-16° C. and slowly warmed to room temperature on standing overnight. The amine hydrochloride was filtered off. The filtrate was then concentrated under a vacuum at 30° C. to yield a fluid liquid identified as allyl epoxypropyl carbonate:

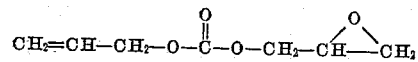

epoxy value=0.62 eq./100 g.     ester 0.96 eq./100 g

The above ester is polymerized through the allyl group by heating at 40° C. in the presence of benzoyl peroxide to form a viscous liquid which is valuable as a combined plasticizer-stabilizer for poly(vinyl chloride).

The above ester is also polymerized to a viscous liquid by heat at 40° C. with 1% 2,4,6-bis(dimethylaminomethyl)phenol. This polymer is also useful as a plasticizer for poly(vinyl chloride).

*Example II*

This example illustrates the preparation and some of the properties of ethylene glycol bis(2,3-epoxypropyl carbonate).

About 148 parts of glycidol is dissolved in 400 parts of toluene and 202 parts of triethylamine and the mixture placed in a reaction kettle described in Example I. The temperature of the mixture is reduced to 5° C. and then 171 parts of ethylene glycol bis(chlorocarbonate) added slowly through the dropping funnel. The mixture is held at 12° C. and then warmed to room temperature on standing overnight. The amine hydrochloride is filtered off and the filtrate concentrated under vacuum to yield liquid ethylene glycol bis(2,3-epoxypropyl carbonate).

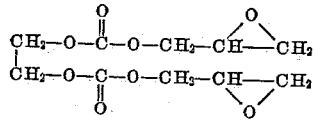

The above ester may be used as a lubricant and as a combined plasticizer-stabilizer for poly(vinyl chloride). The ester may also be polymerized when heated with 1% ethylene diamine to form a solid polymer.

Esters having related properties may be obtained by replacing the ethylene glycol in the above-described preparation process with equivalent amounts of each of the following: 1,5-pentanediol, 1,6-hexanediol, diethylene glycol, triethylene glycol and glycerol.

*Example III*

This example illustrates the preparation and some of the properties of allyl epoxypropoxyethyl carbonate.

About 102 parts of epoxypropoxyethanol (glycidyl ether of ethylene glycol) is combined with 400 parts of toluene and 101 parts of triethylamine and the mixture placed in the reaction kettle described in Example I. The temperature of the mixture is reduced to 5° C. and then 120 parts of allyl chlorocarbonate added slowly through the dropping funnel. The mixture is held at 10° C. and allowed to stand overnight. The amine hydrochloride is filtered off and the filtrate concentrated under vacuum to yield liquid allyl epoxypropoxyethyl carbonate

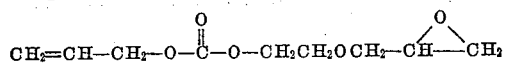

The allyl epoxypropoxyethyl carbonate is of value as an improved plasticizer-stabilizer for poly(vinyl chloride) and as a textile lubricant. The ester may also be polymerized when heated with 5% benzoyl peroxide or 2% ethylene diamine to form a viscous polymer resin suitable for use as a plasticizer for vinyl chloride polymers.

Esters having related properties may be obtained by replacing the epoxypropoxyethanol in the above preparation process with equivalent amounts of each of the following: 2,3-epoxypropoxypentanol, 2,3-epoxypropoxyethoxyethanol and 2,3-epoxybutoxypropanol.

*Example IV*

This example illustrates the preparation and some of the properties of 2,3-epoxypropyl chlorocarbonate.

Phosgene is bubbled into a flask containing 74 parts of glycidol and 101 parts triethylamine until about 55 parts had been introduced. The mixture was kept at 5° C. overnight. The mixture was then filtered to remove the amine hydrochloride followed by additional washing to remove excess amine. The resulting product comprises 2,3-epoxypropyl chlorocarbonate:

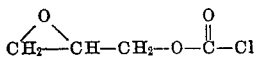

This compound readily reacts with alcohols to form epoxy esters and with amines to form epoxy carbamates. It may also react with tertiary alkyl hydroperoxides to form epoxy peresters.

*Example V*

This example illustrates the preparation and properties of phenyl 2,3-epoxypropyl carbonate.

About 90 parts of glycidol is combined with 400 parts of toluene and 101 parts of triethylamine and the mixture placed in the reaction kettle described in Example I. The temperature of the mixture is reduced to 5° C. and then 172 parts of phenyl chlorocarbonate is slowly added through the dropping funnel. The mixture is held at 10° C. and then allowed to stand overnight. The amine hydrochloride is filtered off and the filtrate concentrated under vacuum to yield phenyl 2,3-epoxypropyl carbonate:

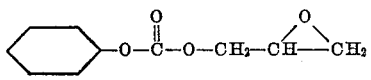

The phenyl 2,3-epoxypropyl carbonate is of particular value as a stabilizer for poly(vinyl chloride) and as a textile lubricant. The ester may also be polymerized when heated with ethylene diamine to form a resinous polymer.

Esters having related properties may be obtained by replacing the phenyl chlorothionocarbonate with equivalent amounts of each of the following: tolyl chlorocarbonate, cyclohexyl chlorocarbonate, dodecyl chlorocarbonate and benzyl chlorocarbonate.

*Example VI*

This example illustrates the use of the polyepoxides of the present invention as crease-proofing agents for textiles.

About 50 parts of the ethylene glycol bis(2,3-epoxypropyl carbonate) produced in Example II is dissolved in 500 parts of an isopropyl alcohol-water solution, and then 20 parts of citric acid added to the resulting solution. Cotton gingham cloth is then impregnated with the above-described solution by means of the Butterworth 3-Roll Laboratory Padder. The impregnated cloth is then dried at 60° C. and cured at 160° C. for 5 minutes. The finished cloth is then washed with Ivory Flakes and rinsed three times in warm water to remove any soluble material. The cloth treated in this manner is quite soft and has wrinkle and shrink resistance and no chlorine retention.

I claim as my invention:

1. An ester of a monohydric epoxy alcohol selected from the group consisting of epoxyalkanols, epoxyalkoxyalkanols, epoxycycloalkanols and epoxyalkoxycycloalkanols, said alcohols possessing a single

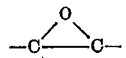

group and containing from 3 to 18 carbon atoms, and an acid component of the group consisting of carbonic acid, carbonic acid monohalides, acid esters of carbonic acid of the formula

wherein R is a radical derived by removing an OH group from a monohydric compound of the group consisting of aliphatic and mononuclear five to six-membered cycloaliphatic monohydric alcohols containing 3 to 12 carbon atoms and mononuclear monohydric phenols containing from 6 to 12 carbon atoms, and acid esters of the formula

wherein R is a radical derived by removing the two OH groups from a dihydric compound of the group consisting of aliphatic and mononuclear five to six-membered cycloaliphatic dihydric alcohols containing from 2 to 16 carbon atoms and mononuclear dihydric phenols containing from 6 to 18 carbon atoms and dinuclear dihydric phenols containing from 13 to 18 carbon atoms, the

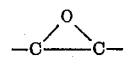

group in the said epoxy alcohol remaining intact in the ester molecules.

2. An ester as defined in claim 1 wherein the acid component is an acid ester of the formula

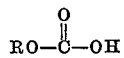

wherein R is a saturated aliphatic hydrocarbon radical containing from 3 to 10 carbon atoms.

3. An ester as defined in claim 1 wherein the acid component is an acid ester of the formula

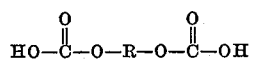

wherein R is a bivalent saturated aliphatic hydrocarbon radical containing from 2 to 16 carbon atoms.

4. An ester as defined in claim 1 wherein the acid component is an alkenyl hydrogen carbonate wherein the alkenyl radical contains from 3 to 12 carbon atoms.

5. An ester as defined in claim 1 wherein the acid component is an alkanediol bis(hydrogen carbonate) wherein the alkanediol portion of the molecule contains from 2 to 16 carbon atoms.

6. An ester as defined in claim 1 wherein the epoxy alcohol is an epoxyalkoxyalkanol containing from 3 to 12 carbon atoms.

7. An alkenyl vic-epoxyalkyl carbonate wherein the alkenyl radical contains from 3 to 12 carbon atoms and the epoxyalkyl radical contains from 3 to 18 carbon atoms.

8. An vic-epoxyalkyl chlorocarbonate wherein the epoxyalkyl radical contains from 3 to 18 carbon atoms.

9. Di(2,3-epoxypropoxyethyl) carbonate.

10. Allyl 2,3-epoxypropyl carbonate.

11. A compound of the formula

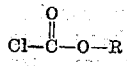

wherein R is an vic-epoxyalkyl radical containing from 3 to 12 carbon atoms.

12. Ethylene glycol bis(2,3-epoxypropyl carbonate).
13. Di(2,3-epoxypropyl) carbonate.
14. A polymer of the ester defined in claim 1.
15. A polymer of the ester defined in claim 2.
16. A polymer of the ester defined in claim 10.
17. A polymer of the ester defined in claim 13.
18. A polymer of the ester defined in claim 12.

References Cited in the file of this patent

UNITED STATES PATENTS

| | | |
|---|---|---|
| 2,556,075 | Erickson | June 5, 1951 |
| 2,595,214 | Adelson | May 6, 1952 |
| 2,599,817 | Evans et al. | June 10, 1952 |
| 2,627,521 | Coover | Feb. 3, 1953 |
| 2,636,040 | Bruson et al. | Apr. 21, 1953 |